US007830976B2

(12) United States Patent
Gorokhov et al.

(10) Patent No.: US 7,830,976 B2
(45) Date of Patent: Nov. 9, 2010

(54) ITERATIVE CHANNEL AND INTERFERENCE ESTIMATION WITH DEDICATED PILOT TONES FOR OFDMA

(75) Inventors: Alexei Gorokhov, San Diego, CA (US); Avneesh Agrawal, San Diego, CA (US); Dhananjay Ashok Gore, San Diego, CA (US); Arvind Vijay Keerthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 906 days.

(21) Appl. No.: 11/182,235

(22) Filed: Jul. 15, 2005

(65) Prior Publication Data

US 2006/0109922 A1    May 25, 2006

Related U.S. Application Data

(60) Provisional application No. 60/588,646, filed on Jul. 16, 2004, provisional application No. 60/639,157, filed on Dec. 22, 2004.

(51) Int. Cl.
*H04B 7/02* (2006.01)

(52) U.S. Cl. .................. 375/267; 375/341; 375/343; 375/346; 375/340; 375/350; 370/292; 370/321

(58) Field of Classification Search .............. 375/346, 375/316, 350
See application file for complete search history.

(56) References Cited

U.S. PATENT DOCUMENTS 6,577,668 B2 * 6/2003 Zeira et al. ................ 375/130

6,614,857 B1 * 9/2003 Buehrer et al. ............. 375/340
6,768,713 B1 * 7/2004 Siala et al. ................. 370/203

(Continued)

FOREIGN PATENT DOCUMENTS

CN        1272005        11/2000

(Continued)

OTHER PUBLICATIONS

Morelli et al, "Estimation of Channel Statistics for Iterative Detection of OFDM Signals", 2004, pp. 847-851.

(Continued)

*Primary Examiner*—Shuwang Liu
*Assistant Examiner*—Lihong Yu
(74) *Attorney, Agent, or Firm*—Dmitry R. Milikovsky; Stanton C. Braden (57) ABSTRACT

Estimation of channel characteristics and interference level in a time-varying multi-carrier multi-user systems is carried out concurrently. To perform the estimation, a multitude of data symbols and dedicated pilot symbols are transmitted over the channel. Next, an initial estimate value is selected for the interference level. The initial estimate value for the interference level is used together with the received pilot symbols to provide a first estimate of the channel. The first estimate of the channel is used to determine a new updated value for the interference level, which in turn, is used to update the value of the first estimate of the channel iteratively. The iterations continue until the iteratively updated values of the interference level and channel satisfy predefined limits. The data symbols and the final updated value of the channel are subsequently used to provide a second estimate for the channel.

21 Claims, 3 Drawing Sheets

U.S. PATENT DOCUMENTS

| | | | |
|---|---|---|---|
| 7,113,555 B2* | 9/2006 | Campello de Souza et al. | 375/341 |
| 7,139,336 B2* | 11/2006 | Nefedov | 375/341 |
| 2005/0176436 A1* | 8/2005 | Mantravadi et al. | 455/450 |

FOREIGN PATENT DOCUMENTS

JP          2003218826          7/2003

OTHER PUBLICATIONS

Jinho Choi, "A Joint Channel Estimation and Detection for Frequency-Domain Equalization Using an Approximate EM Algorithm", pp. 865-880, 2004.

Sun et al, "Iterative Channel Estimation With MIMO MMSE-Turbo Equalisation", 2003, pp. 1278-1282.

Marques et al, "Low-Complexity Channel Estimation FRO Beyond 3G Systems", 2004 pp. 2148-2152.

International Search Report—PCT/US05/025609—International Search Authority—EPO—Nov. 15, 2005.

Written Opinion—PCT/US05/025609—International Search Authority—EPO—Nov. 15, 2005.

International Preliminary Report on Patentability—PCT/US05/025609—EPO—Berlin—Jun. 29, 2006.

Valenti, et al,: "Iterative Channel Estimation and Decoding of Pilor Symbol Assisted Turbo Codes Over Flat-Fading Channels" IEEE Journal on Selected Areas in Communications, May 1, 2001, pp. 1697-1705, Piscataway, US.

* cited by examiner

ITERATIVE CHANNEL AND INTERFERENCE ESTIMATION WITH DEDICATED PILOT TONES FOR OFDMA

CROSS-REFERENCES TO RELATED APPLICATIONS

The present application claims benefit under 35 U.S.C. 119(e) of U.S. provisional application No. 60/639,157, filed Dec. 22, 2004, entitled "Iterative Channel And Interference Estimation With Dedicated Pilot Tones For OFDMA", and U.S. provisional application No. 60/588,646, filed Jul. 16, 2004, entitled "Iterative Channel and Interference Estimation with Dedicated Pilots," the contents of which are incorporate herein by reference in their entireties.

BACKGROUND OF THE DISCLOSURE

The present disclosure relates to wireless digital communication systems, and more particularly to estimation of channel characteristics and interference level in such systems.

Demand for wireless digital communication and data processing systems is on the rise. Inherent in most digital communication channels are errors introduced when transferring frames, packets or cells containing data. Such errors are often caused by electrical interference or thermal noise. Data transmission error rates depend, in part, on the medium which carries the data. Typical bit error rates for copper based data transmission systems are in the order of 10-6. Optical fibers have typical bit error rates of 10-9 or less. Wireless transmission systems, on the other hand, may have error rates of 10-3 or higher. The relatively high bit error rates of wireless transmission systems pose certain difficulties in encoding and decoding of data transmitted via such systems. Partly because of its mathematical tractability and partly because of its application to a broad class of physical communication channels, the additive white Gaussian noise (AWGN) model is often used to characterize the noise in most communication channels.

Data is often encoded at the transmitter, in a controlled manner, to include redundancy. The redundancy is subsequently used by the receiver to overcome the noise and interference introduced in the data while being transmitted through the channel. For example, the transmitter might encode k bits with n bits where n is greater than k, according to some coding scheme. The amount of redundancy introduced by the encoding of the data is determined by the ratio n/k, the inverse of which is referred to as the code rate. Codewords representing the n-bit sequences are generated by an encoder and delivered to a modulator that interfaces with the communication channel. The modulator maps each received sequence into a symbol. In M-ary signaling, the modulator maps each n-bit sequence into one of M=2n symbols. Data in other than binary form may be encoded, but typically data is representable by a binary digit sequence.

Often it is desired to estimate the channel and the level of interference. On the forward link (FL), common pilot symbols are known to have been used. In orthogonal frequency division multiplexing (OFDMA) systems, such common pilot symbols are typically scattered over the entire bandwidth shared by all the users. In a traditional single-antenna transmission, such common pilot symbols may be exploited by all the users for the purpose of FL channel estimation. The bandwidth and channel coherence time values that are typical in cellular applications render common pilot tones particularly useful. However, common pilot symbols are broadcast to all the users and, therefore, are not adapted to carry user-specific signature.

BRIEF SUMMARY OF THE DISCLOSURE

Estimation of channel characteristics and interference level in a time-varying multi-carrier multi-user systems is carried out concurrently. To perform the estimation, a multitude of data symbols and dedicated pilot symbols are transmitted over the channel. Next, an initial estimate value is selected for the interference level. The initial estimate value for the interference level is used together with the received pilot symbols to provide a first estimate of the channel. The first estimate of the channel is used to determine a new updated value for the interference level, which in turn, is used to update the value of the first estimate of the channel iteratively. The iterations continue until the iteratively updated values of the interference level and channel satisfy predefined limits. The data symbols and the final updated value of the channel are subsequently used to provide a second estimate for the channel.

In some embodiments, first and second channel estimates $\hat{H}^{(p)}$ and $\hat{H}^{(d)}$ are related to the initial estimate value $\hat{I}_0$ for the interference level in accordance with the following expression:

$$\begin{bmatrix} \hat{H}^{(p)} \\ \hat{H}^{(d)} \end{bmatrix} := \begin{bmatrix} R_{pp} \\ R_{dp} \end{bmatrix} \left( R_{pp} + (E_p/\hat{I}_0)^{-1} I_{N_p} \right)^{-1} x$$

In the above expression, $R_{pp}$, $R_{dd}$ and $R_{dp}$ are elements of the covariance matrix R of the channel, as shown below:

$$R = \begin{bmatrix} R_{pp} & R_{dp}^* \\ R_{dp} & R_{dd} \end{bmatrix}$$

$R_{pp}$ has $N_p \times N_p$ elements, $R_{dp}$ has $N_d \times N_p$ elements and $R_{dd}$ has $N_d \times N_d$ elements. Furthermore, $N_p$ is the number of transmitted pilot symbols, $N_d$ is the number of transmitted data symbols, $E_p$ is the pilot energy per pilot symbol, and x is the vector of received pilot symbols.

In accordance with another embodiment, to simplify the computations, the pilot channel covariance matrix $R_{pp}$ is eigendecomposed to further simplify mathematical operations. In such an embodiment, channel estimates $\hat{H}^{(d)}$ and $\hat{H}^{(p)}$ are related to $\hat{I}_0$ in accordance with the following expression:

$$\begin{bmatrix} \hat{H}^{(p)} \\ \hat{H}^{(d)} \end{bmatrix} := B\left( \Lambda + (E_p/\hat{I}_0)^{-1} I_{N_p} \right)^{-1} U^* x$$

In such embodiments, matrix B is defined as shown below:

$$B := \begin{bmatrix} U\Lambda \\ R_{dp}U \end{bmatrix}$$

where U is a $N_p \times m$ unitary matrix of eigenvectors corresponding to the principal components of $R_{pp}$, $\Lambda$ is an m×m diagonal matrix of the associated principal eigenvalues, with m being the numerical rank of $R_{pp}$ defined below:

$$R_{pp} = U\Lambda U^*$$

Since m represents the number of free parameters (degrees of freedom) of the channel in frequency and time, m may be selected so as to be smaller than $N_p$ without noticeable performance loss. Hence, in one embodiment, m is selected to be smaller than $N_p$ by a factor of two or more. In other embodiments, $N_p$ may set the upper limit for m. In some embodiments of an OFDMA system, m may be selected to be less than 10. Factors affecting m, in part, are the desired performance, on the one hand, and complexity on the other.

DETAILED DESCRIPTION OF THE DISCLOSURE

In accordance with the present disclosure, estimation of channel characteristics and interference level in a time-varying multi-carrier multi-user OFDMA system is carried out concurrently. To estimate the channel and the interference level, in accordance with the present disclosure, a multitude of pilot symbols are disposed adjacent the data symbols in forward link (FL) transmissions. In OFDMA systems, the dedicated pilot symbols are typically placed within the traffic band of the user, in a somewhat uniform manner in order to achieve channel interpolation across frequency and time. The relative bandwidth efficiency of the common pilot symbols versus dedicated pilot symbols is related to a comparison between the total number of degrees of freedom in a broadband channel corresponding to the total shared bandwidth, estimated with the common pilot, and the number of degrees of freedom in a narrow-band sub-channel allocated per user multiplied by the number of such narrow-band sub-channels.

The use of the dedicated pilot tones, in accordance with one aspect of the present disclosure, provides a number of advantages. First, dedicated pilot tones that are scattered over the user traffic bandwidth may be used to estimate the interference level as seen by the user, particularly in synchronous multi-cell designs where the interference level may be assumed quasi-static across any given sub-channel. Second, dedicated pilot symbols may support channel estimation for any sub-channel user sensitive signaling, such as adaptive beamforming. In channel sensitive signaling, a set of dedicated pilot symbols may be transmitted according to the desired channel-sensitive signaling. As is known, common pilot symbols are broadcast to all the users and therefore are not adapted to carry user-specific signature whereas dedicated pilot tones in accordance with the present disclosure are adapted to carry user-specific signature.

The dedicated pilot symbols are used to concurrently and iteratively estimate the channel and interference level in the absence of any prior estimate of either the channel or the interference level. The algorithm which performs the estimation, alternates between the robust minimum mean squared error estimation (RMMSE) step, based on some empirical interference level value, and the interference estimation step. Unless otherwise indicated, it is understood that each scalar quantity, vector component or matrix element described below may be a complex number. The labeling convention used herein for alphanumeric symbols represents scalar quantities as italic symbols, vectors as lowercase bold symbols, and matrices as uppercase bold symbols.

Figure 1:
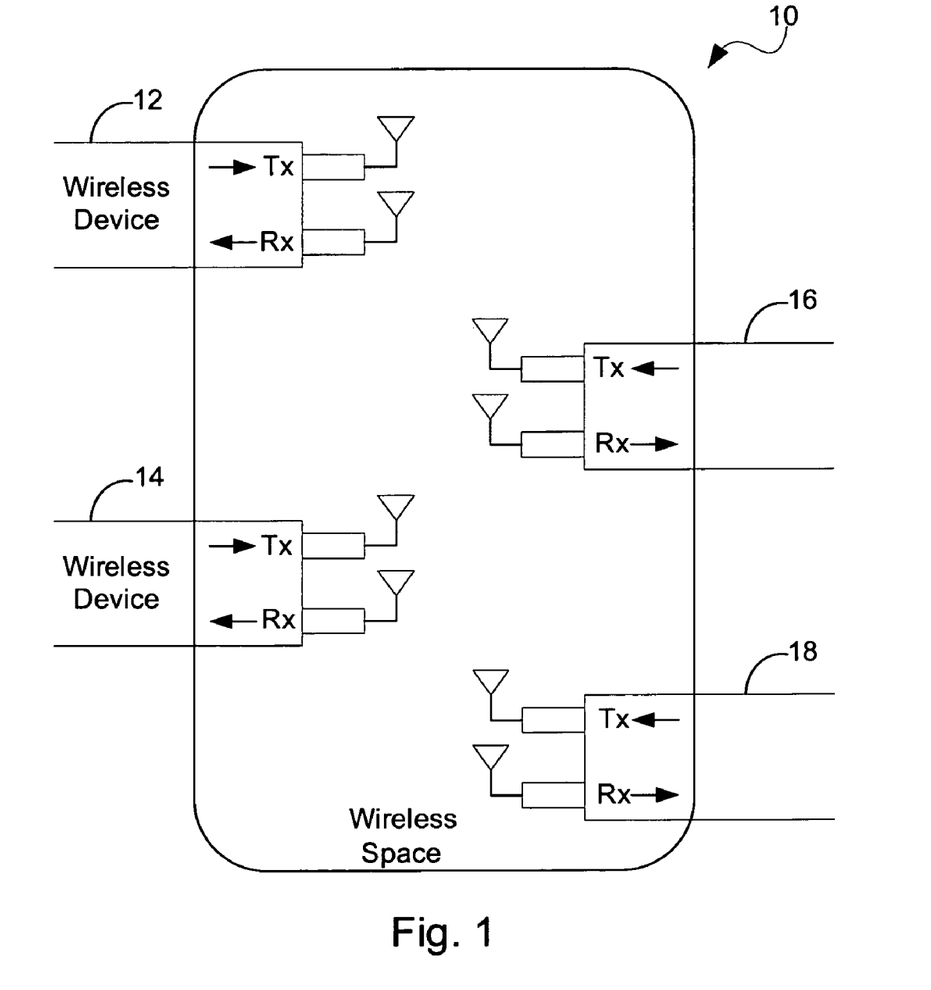
FIG. 1 shows a number of communication devices adapted to communicate via one or more wireless networks.

FIG. 1 shows an example of a wireless network 10 being used for communications among transmitters/receivers 12, 14 and transmitters/receivers 16, 18 as indicated. Each of the transmitters/receivers 12, 14, 16, 18 may have a single or multiple transmit/receive antennas. While separate transmit and receive antennas are shown, antennas may be used for both transmitting and receiving signals. The free space medium forming the channel through which the signals are transmitted is often noisy affecting the received signal. Estimates of the transmission channel's characteristics and the interference level due to noise is often made at the receiver.

Figure 2:
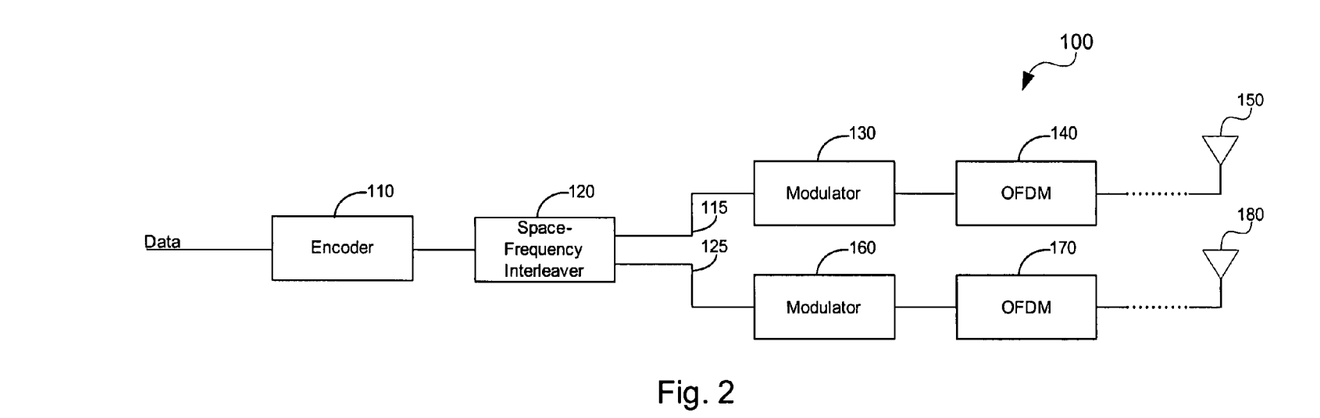
FIG. 2 is a high-level block diagram of some of the blocks disposed in the transmitting end of a wireless communication system.

FIG. 2 is a simplified block diagram of a transmitting end of wireless transmission system 100. Wireless transmission system is shown as including, in part, an encoder 110, a space-frequency interleaver 120, modulators 130, 160, OFDMA blocks 140, 170, and transmit antennas 150, 180. Modulator 130, OFDMA block 140, and transmit antenna 150 are disposed in the first transmission path 115; and modulator 160, OFDMA block 170, and transmit antenna 180 are disposed in the second transmission path 125. Although the exemplary embodiment 100 of the wireless transmission system is shown as including only two transmission paths, it is understood that the wireless transmission system 100 may include more than two transmission paths. The data transmitted by the transmit antennas 150, 180 are received by one or more receive antennas of a wireless receive system.

Figure 3:
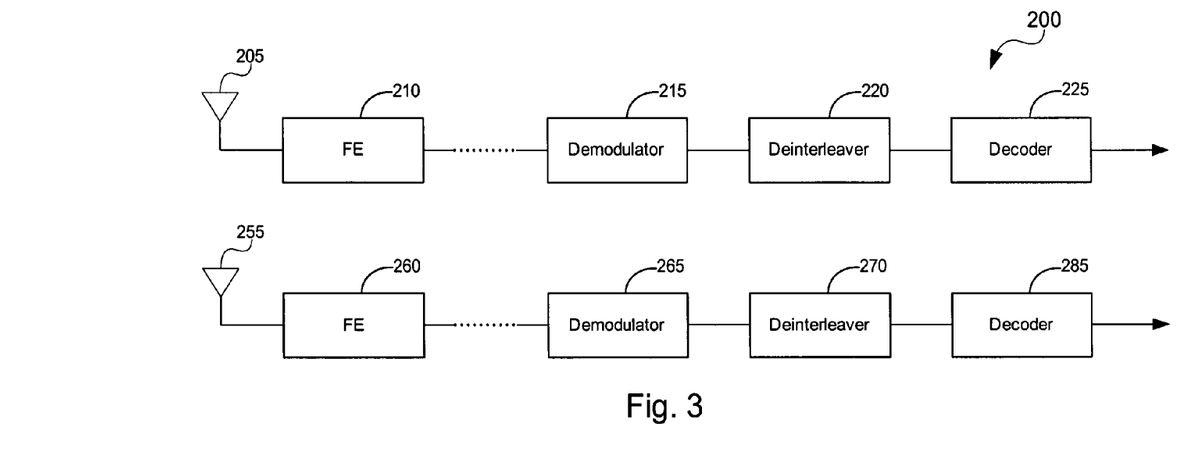
FIG. 3 is a high-level block diagram of some of the blocks disposed in the receiving end of a wireless communication system

FIG. 3 is a simplified block diagram of a receiving end of a wireless transmission system 200. Wireless transmission system 200 is shown as including, in part, receive antenna 205, 255, front-end blocks 210, 260, demodulators 215, 265, space-frequency deinterleavers 220, 270, and decoders 225, 285. Wireless transmission system 200 is shown as including a pair of receive transmission paths, it is understood that the wireless transmission system 200 may include more than two transmission paths.

Figure 4:
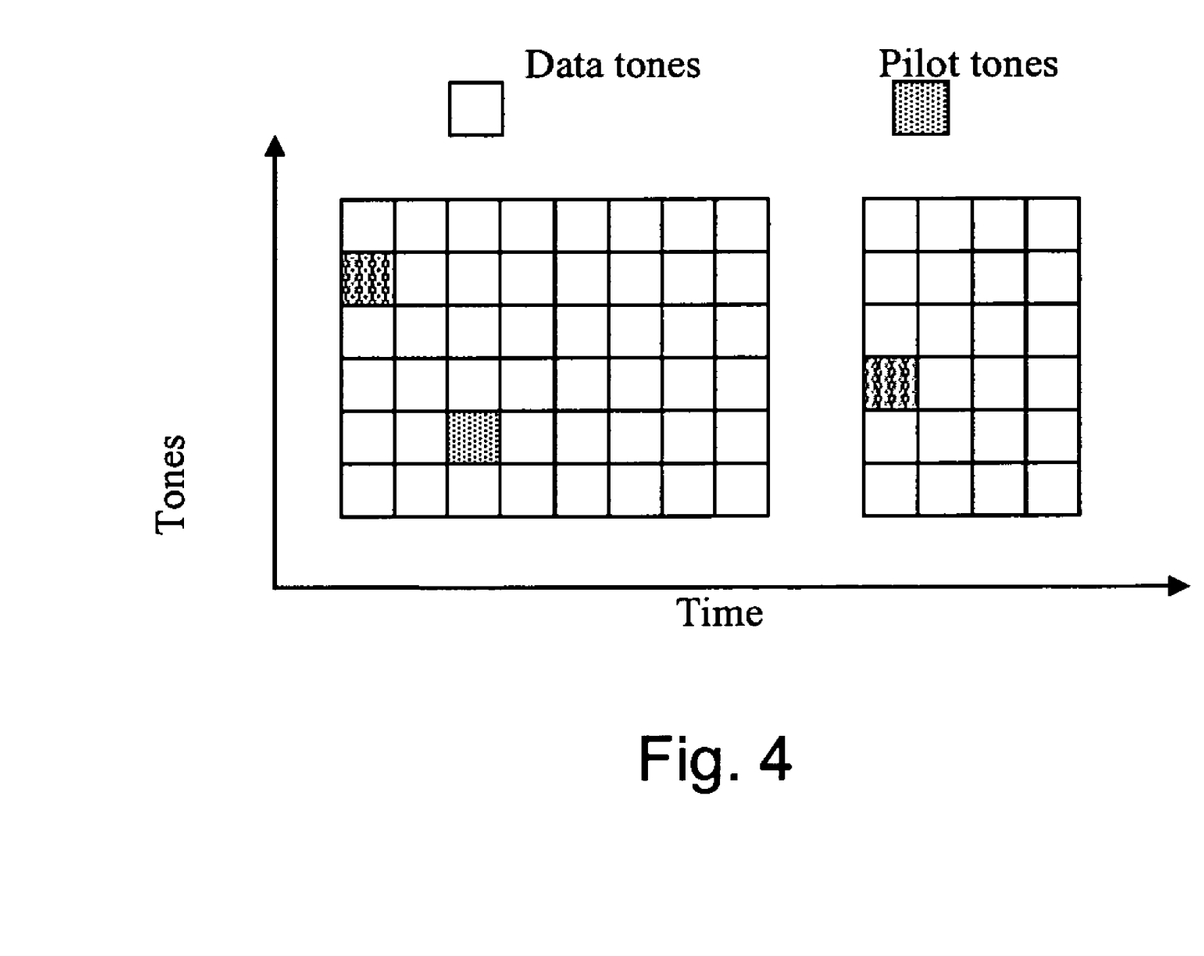
FIG. 4 shows a multitude of dedicated pilot symbols disposed between data symbols to enable concurrent estimation of channel characteristics and interference level, in accordance with the present disclosure.

The following algorithm provides estimates of the channel and the interference level using the pilot tones transmitted via either the forward link (FL) or the reverse link (RL) of a wireless communication system. Assume an OFDMA transmission with N orthogonal modulation symbols spaced by $f_s$. Assume that the transmitter sends pilot symbols over a given time frequency pattern known to the receiver, as illustrated by FIG. 4. Assume further that a given user is assigned a sub-channel including $N_d$ data (i.e., traffic) symbols and $N_p$ pilot symbols that are used together to estimate the channel and interference level. Each symbol within this sub-channel is defined to be characterized by a pair (k, n), where k stands for the tone index ($0 \leq k < N$) and n stands for the OFDMA symbol index.

A brief description of the theory underlying the RMMSE follows. Assume that $S_d$ and $S_p$ denote the set of all tone/OFDMA symbol pairs related to the traffic and dedicated pilot symbols respectively. Assume further that H is a $N_s \times 1$ vector of complex channel amplitudes, in the frequency domain, corresponding to the whole set of $N_s=(N_d+N_p)$ symbols, including traffic and pilot symbols. Accordingly, H may be defined as follows:

$$H=[H_1, \ldots, H_{N_s}]^T$$

Assume, without loss of generality, that the first $N_p$ entries of H, denoted $H^{(p)}$, correspond to the pilot symbols, whereas the remaining $N_d$ entries of H, namely $H^{(d)}$ correspond to the traffic symbols. Accordingly, the second order channel model and the observation model may be defined by the following:

$$x=\sqrt{E_p}H^{(p)}+\sqrt{I_0}n, \; E\{H H^*\}=R, \tag{1}$$

where $E_p$ is the pilot energy per pilot symbol, $I_0$ is the combined interference and noise energy per pilot/traffic symbol, n is the normalized interference assumed independent identically distributed with zero mean unit variance circular Gaussian and R is the expected $N_s \times N_s$ covariance matrix of the channel. In expression (1), for simplicity, pilot symbols are assumed to have unit values, e.g., pilot values are constant modulus (PSK).

Expression (1) provides the minimum mean squared error (MMSE) estimates for the pilot and the traffic channel, respectively as shown below:

$$\hat{H}^{(p)} = R_{pp}(R_{pp} + (E_p/I_0)^{-1}I_{N_p})^{-1}x, \tag{2}$$
$$\hat{H}^{(d)} = R_{dp}(R_{pp} + (E_p/I_0)^{-1}I_{N_p})^{-1}x,$$

$$R = \begin{bmatrix} R_{pp} & R_{dp}^* \\ R_{dp} & R_{dd} \end{bmatrix}, \tag{3}$$

where:

$$R_{pp}=N_p \times N_p,$$
$$R_{dd}=N_d \times N_d, \text{ and}$$
$$R_{dp}=N_d \times N_p$$

where $I_{N_p}$ is an identity matrix.

If the interference level $I_0$ is known at the receiver, expression (2) supplies the desired traffic channel estimate. The accuracy of the estimate depends on the value of $I_0$. Overestimation of $I_0$ would force more averaging thereby increasing the impact of channel decorrelation over time/frequency. Underestimation of $I_0$ would increase the interference contribution. Therefore, the more accurate the knowledge of $I_0$, the more accurate is the estimation of the channel, specially when the pilot overhead ($N_p$) is small.

The iterative channel and interference level estimation, in accordance with the present disclosure, includes alternating the RMMSE estimator with an interference estimation step which is based on the preceding estimate $\hat{H}^{(p)}$, as shown further below:

$$\hat{I}_0 = \frac{1}{N_p - k}\sum_{l=1}^{N_p}|\hat{e}_l|^2, \; \hat{e}=[\hat{e}_1, \ldots, \hat{e}_{N_p}]^T = x - \hat{H}^{(p)}. \tag{6}$$

where k is an integer.

The estimate $\hat{I}_0$ is subsequently used in the following channel estimation (RMMSE) step. Table I below shows a pseudo-code and associated mathematical expressions used in the iterative channel and interference estimation algorithm. The initial value of $\hat{I}_0$, namely $I_0^\%$, is selected based on the knowledge about the interference level available in the system. A conservative choice of $I_0^\%$ (i.e., if the initial estimate of $I_0^\%$ is assumed to be significantly greater than the actual $I_0$) may avoid divergence of the estimation error at the early stage. However, an aggressive choice of $I_0^\%$ (i.e., if the initial estimate of $I_0^\%$ is assumed to be significantly smaller than the actual $I_0$) may be needed if the pilot energy budget is small; otherwise estimation accuracy may not improve by performing the iterative algorithm.

TABLE I $\hat{I}_0 = I_0^\%$;

while iterations $\hat{H}^{(p)} := R_{pp}(R_{pp} + (E_p/I_0)^{-1}I_{N_p})^{-1}$;

$\hat{I}_0 := \frac{1}{N_p - \kappa}\|x - \hat{H}^{(p)}\|^2$;

end

Convergence of the iterative procedure in Table I may pose certain difficulties. Due to the non-linear form of the update, the stability analysis may become intractable. Some heuristic arguments on the statistical behavior follows. First, both channel and interference estimation error variance exhibit monotonic behavior. A reduction in channel estimation error variance may lead to the reduction in the interference power estimation error. Likewise, more accurate interference power estimation may improve channel estimation accuracy. Furthermore, an abnormal behavior of the channel estimate, caused, for example, by setting $\hat{I}_0=\tilde{I}_0$ may increase $\hat{I}_0$ at the next step of interference power estimation. If $\hat{I}_0$ is so increased, a more conservative value of $\hat{I}_0$ is used at the pilot observations acquired during the next step. Therefore, the iterative procedure described in Table I provides stable values for $\hat{I}_0$. In some embodiments of the above numerical calculations, 5 to 10 iterations are utilized to estimate the channel and the interference level.

One mathematical operation associated with the algorithm shown in Table I, is the matrix inversion that is repeatedly performed to updated the value of $\hat{I}_0$. This operation may be complex for a practical sub-channel size and the corresponding number of pilot symbols ($N_p>10$). To handle such situations, in accordance with the present disclosure, a simplification based on the eigendecomposition of the pilot channel covariance matrix $R_{pp}$ is made, as described further below:

$$R_{pp}=U\Lambda U^* \tag{7}$$

In equation (7), U is a $N_p \times m$ unitary matrix of eigenvectors corresponding to m principal components of $R_{pp}$, and $\Lambda$ is an $m \times m$ diagonal matrix of the associated non-zero eigenvalues, with m being the numerical rank of $R_{pp}$.

Table II below is a pseudo-code and associated mathematical expressions defining an algorithm, in accordance with present disclosure, that is obtained by combining equation (7) with the algorithm shown in Table I, and performing relevant algebra.

TABLE II

Pre-computed:

$$B := \begin{bmatrix} U\Lambda \\ R_{dp}U \end{bmatrix}.$$

$$\hat{I}_0 = I_0^\infty;$$

while iterations $$\hat{H}^{(p)} := B(\Lambda + (E_p/\hat{I}_0)^{-1} I_{N_p})^{-1} U^* x;$$

$$\hat{I}_0 := \frac{1}{N_p - \kappa} \|x - \hat{H}^{(p)}\|^2;$$

end

The inversion of the diagonal matrix is equivalent to m scalar inversions. A relatively large amount of memory may be utilized to store the values associated with matrices B and U. This memory requirement may be reduced by truncating the number m associated with the principal components of $R_{pp}$. Since m represents the number of free parameters (degrees of freedom) of the channel in frequency and time, m may be selected so as to be smaller than $N_p$ without noticeable performance loss. Hence, in one embodiment, m is selected to be smaller than $N_p$ by a factor of two or more. In other embodiments, $N_p$ may be the upper limit for m. In some embodiments of an OFDMA system, m may be selected to be less than 10. Factors affecting m, are the desired performance, on the one hand, and complexity on the other.

The channel and interference level estimation may be carried out using various codes of one or more software modules forming a program and executed as instructions/data by, e.g., a central processing unit, or using hardware modules specifically configured and dedicated to determine the channel and interference level. Alternatively, in both embodiments, the channel and interference level estimation may be carried out using a combination of software and hardware modules.

The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of estimating a channel and an interference level of a wireless communication system, the computer-implemented method comprising:
    receiving a multitude of data symbols transmitted over the channel;
    receiving a multitude of dedicated pilot symbols disposed between the multitude of data symbols and transmitted over the channel, the dedicated pilot symbols adapted to carry a user-specific signature;
    assigning an estimate value for the interference level;
    determining a first estimate value for the channel defined by the received dedicated pilot symbols and in accordance with the estimate value of the interference level;
    modifying the estimate value of the interference level in accordance with the first estimate value of the channel and the received dedicated pilot symbols;
    modifying the first estimate value of the channel in accordance with the modified estimate value of the interference level;
    repeating the modifying steps until the modified estimate values of the interference level and the channel satisfy predefined conditions; and
    determining a second estimate value of the channel defined by the received data symbols and in accordance with the modified estimate values of the interference level and the channel and that satisfy the predefined conditions.

2. The method of claim 1 wherein said computer-implemented method is applied to symbols received via a forward link of a wireless communication system that is an OFDMA system.

3. The method of claim 1 wherein said computer-implemented method is applied to symbols received via a reverse link of a wireless communication system that is an OFDMA system.

4. The method of claim 1 wherein the first estimate value $\hat{H}^{(p)}$ of the channel and the second estimate value $\hat{H}^{(d)}$ of the channel are defined by the first estimate value $\hat{I}_o$ of the interference level as shown below:

$$\begin{bmatrix} \hat{H}^{(p)} \\ \hat{H}^{(d)} \end{bmatrix} := \begin{bmatrix} R_{pp} \\ R_{dp} \end{bmatrix} (R_{pp} + (E_p/\hat{I}_0)^{-1} I_{N_p})^{-1} x$$

where $R_{pp}$, $R_{dd}$ and $R_{dp}$ are elements of vector R as shown below:

$$R = \begin{bmatrix} R_{pp} & R_{dp}^* \\ R_{dp} & R_{dd} \end{bmatrix},$$

where R is the covariance matrix of the channel H, wherein $R_{pp}$ has $N_p \times N_p$ elements, wherein $R_{dp}$ has $N_d \times N_p$ elements and wherein $R_{dd}$ has $N_d \times N_d$ elements, wherein $N_p$ is the number of transmitted pilot symbols and $N_d$ is the number of transmitted data symbols, wherein $E_p$ is the pilot energy per pilot symbol, and wherein x is the vector of received pilot symbols.

5. The method of claim 1 wherein the first estimate value $\hat{H}^{(p)}$ of the channel and the second estimate value $\hat{H}^{(d)}$ of the channel are defined by first estimate value $\hat{I}_o$ of the interference level as shown below:

$$\begin{bmatrix} \hat{H}^{(p)} \\ \hat{H}^{(d)} \end{bmatrix} := B\left(\Lambda + (E_p/\hat{I}_0)^{-1} I_{N_p}\right)^{-1} U^* x$$

wherein $$B := \begin{bmatrix} U\Lambda \\ R_{dp}U \end{bmatrix},$$

wherein U is a $N_p \times m$ unitary matrix of eigenvectors corresponding to the non-zero principal components of $R_{pp}$, and $\Lambda$ is an m×m diagonal matrix of the associated non-zero eigenvalues, with m being the numerical rank of $R_{pp}$, wherein $R_{pp} = U\Lambda U^*$, wherein $R_{pp}$, $R_{dd}$ and $R_{dp}$ are elements of vector R as shown below:

$$R = \begin{bmatrix} R_{pp} & R_{dp}^* \\ R_{dp} & R_{dd} \end{bmatrix},$$

where R is the covariance matrix of the channel H, wherein $R_{pp}$ has $N_p \times N_p$ elements, wherein $R_{dp}$ has $N_d \times N_p$ elements and wherein $R_{dd}$ has $N_d \times N_d$ elements, wherein $N_p$ is the number of transmitted pilot symbols and $N_d$ is the number of transmitted data symbols, wherein $E_p$ is the pilot energy per pilot symbol, and wherein x is the vector of received pilot symbols.

6. The method of claim 5 wherein $N_p$ is greater than m.

7. An apparatus adapted to estimate channel and interference level of a wireless communication system, the apparatus comprising:

a first module adapted to receive a multitude of data symbols transmitted over the channel;

a second module adapted to receive a multitude of dedicated pilot symbols disposed between the multitude of data symbols and transmitted over the channel, the dedicated pilot symbols adapted to carry a user-specific signature;

a third module adapted to assign an estimate value for the interference level;

a fourth module adapted to determine a first estimate value for the channel defined by the received dedicated pilot symbols and in accordance with the estimate value of the interference level;

a fifth modifying module adapted to modify the estimate value of the interference level in accordance with the first estimate value of the channel and the received dedicated pilot symbols;

a sixth modifying module adapted to modify the first estimate value of the channel in accordance with the modified estimate value the of the interference value; wherein said fifth and sixth modifying modules are further adapted to continue their respective modifying operations until the modified estimate values of the interference level and the channel satisfy predefined conditions; and a seventh module adapted to determine a second estimate value for the channel defined by the received data symbols and in accordance with the modified estimate values of the interference level and the channel that satisfy the predefined conditions.

8. The apparatus of claim 7 wherein said apparatus is adapted to determine the first and second estimates of the channel of a forward link of a wireless communication systems that is an OFDMA system.

9. The apparatus of claim 7 wherein said apparatus is adapted to determine the first and second estimates of the channel of a reverse link of a wireless communication systems that is an OFDMA system.

10. The apparatus of claim 7 wherein the first estimate value $\hat{H}^{(p)}$ of the channel and the second estimate value $\hat{H}^{(d)}$ of the channel are defined by the first estimate value $\hat{I}_o$ of the interference level as shown below:

$$\begin{bmatrix} \hat{H}^{(p)} \\ \hat{H}^{(d)} \end{bmatrix} := \begin{bmatrix} R_{pp} \\ R_{dp} \end{bmatrix} \left(R_{pp} + (E_p/\hat{I}_o)^{-1} I_{N_p}\right)^{-1} x$$

Where $R_{pp}$, $R_{dd}$ and $R_{dp}$ are elements of vector R as shown below:

$$R = \begin{bmatrix} R_{pp} & R_{dp}^* \\ R_{dp} & R_{dd} \end{bmatrix},$$

where R is the covariance matrix of the channel H, wherein $R_{pp}$ has $N_p \times N_p$ elements, wherein $R_{dp}$ has $N_d \times N_p$ elements and wherein $R_{dd}$ has $N_d \times N_d$ elements, wherein $N_p$ is the number of transmitted pilot symbols and $N_d$ is the number of transmitted data symbols, wherein $E_p$ is the pilot energy per pilot symbol, and wherein x is the vector of received pilot symbols.

11. The apparatus of claim 7 wherein the first estimate value $\hat{H}^{(p)}$ of the channel and the second estimate value $\hat{H}^{(d)}$ of the channel are defined by the first estimate value $\hat{I}_o$ of the interference level as shown below:

$$\begin{bmatrix} \hat{H}^{(p)} \\ \hat{H}^{(d)} \end{bmatrix} := B\left(\Lambda + (E_p/\hat{I}_o)^{-1} I_{N_p}\right)^{-1} U^* x$$

wherein $$B := \begin{bmatrix} U\Lambda \\ R_{dp}U \end{bmatrix},$$

wherein U is a $N_p \times m$ unitary matrix of eigenvectors corresponding to the non-zero principal components of $R_{pp}$, and $\Lambda$ is an m×m diagonal matrix of the associated non-zero eigenvalues, with m being the numerical rank of $R_{pp}$, wherein $R_{pp} = U\Lambda U^*$, wherein $R_{pp}$, $R_{dd}$ and $R_{dp}$ are elements of vector R as shown below:

$$R = \begin{bmatrix} R_{pp} & R_{dp}^* \\ R_{dp} & R_{dd} \end{bmatrix},$$

where R is the covariance matrix of the channel H, wherein $R_{pp}$ has $N_p \times N_p$ elements, wherein $R_{dp}$ has $N_d \times N_p$ elements and wherein $R_{dd}$ has $N_d \times N_d$ elements, wherein $N_p$ is the number of transmitted pilot symbols and $N_d$ is the number of transmitted data symbols, wherein $E_p$ is the pilot energy per pilot symbol, and wherein x is the vector of received pilot symbols.

12. The apparatus of claim 7 wherein $N_p$ is greater than m.

13. The apparatus of claim 7 wherein said first, second, third, fourth, fifth, sixth, and seventh modules are hardware modules.

14. The apparatus of claim 7 wherein said first, second, third, fourth, fifth, sixth, and seventh modules are software modules.

15. The apparatus of claim 7 wherein said first, second, third, fourth, fifth, sixth, and seventh modules include software and hardware modules.

16. An apparatus adapted to estimate channel and interference values of a wireless communication system, the apparatus comprising:
   means for receiving a multitude of data symbols transmitted over the channel;
   means for receiving a multitude of dedicated pilot symbols disposed between the multitude of data symbols and transmitted over the channel, the dedicated pilot symbols adapted to carry a user-specific signature;
   means for assigning an estimate value for the interference level;
   means for determining a first estimate value for the channel defined by the received dedicated pilot symbols and in accordance with the first estimate value of the interference;
   means for modifying the estimate value of the interference level in accordance with the first estimate value of the channel and the received dedicated pilot symbols;
   means for modifying the first estimate value of the channel in accordance with the modified estimate value of the interference level, wherein said modifying means are further adapted to continue their respective modifying operations until the modified estimate values of the interference level and the channel satisfy predefined conditions; and
   means for determining a second estimate value of the channel defined by the received data symbols and in accordance with the modified estimate values of the interference level and the channel that satisfy the predefined conditions.

17. The apparatus of claim 16 wherein said apparatus is adapted to determine the first and second estimates of the channel of a forward link of a wireless communication systems that is an OFDMA system.

18. The apparatus of claim 16 wherein said apparatus is adapted to determine the first and second estimates of the channel of a reverse link of a wireless communication systems that is an OFDMA system.

19. The apparatus of claim 16 wherein the first estimate value $\hat{H}^{(p)}$ of the channel and the second estimate value $\hat{H}^{(d)}$ of the channel are defined by the first estimate value $\hat{I}_o$ of the interference level as shown below:

$$\begin{bmatrix} \hat{H}^{(p)} \\ \hat{H}^{(d)} \end{bmatrix} := \begin{bmatrix} R_{pp} \\ R_{dp} \end{bmatrix} \left( R_{pp} + (E_p/\hat{I}_o)^{-1} I_{N_p} \right)^{-1} x$$

Where $R_{pp}$, $R_{dd}$ and $R_{dp}$ are elements of vector R as shown below:

$$R = \begin{bmatrix} R_{pp} & R_{dp}^* \\ R_{dp} & R_{dd} \end{bmatrix},$$

where R is the covariance matrix of the channel H, wherein $R_{pp}$ has $N_p \times N_p$ elements, wherein $R_{dp}$ has $N_d \times N_p$ elements and wherein $R_{dd}$ has $N_d \times N_d$ elements, wherein $N_p$ is the number of transmitted pilot symbols and $N_d$ is the number of transmitted data symbols, wherein $E_p$ is the pilot energy per pilot symbol, and wherein x is the vector of received pilot symbols.

20. The apparatus of claim 16 wherein the first estimate value $\hat{H}^{(p)}$ of the channel and the second estimate value $\hat{H}^{(d)}$ of the channel are defined by the first estimate value $\hat{I}_o$ of the interference level as shown below:

$$\begin{bmatrix} \hat{H}^{(p)} \\ \hat{H}^{(d)} \end{bmatrix} := B\left( \Lambda + (E_p/\hat{I}_o)^{-1} I_{N_p} \right)^{-1} U^* x$$

wherein $$B := \begin{bmatrix} U\Lambda \\ R_{dp} U \end{bmatrix},$$

wherein U is a $N_p \times m$ unitary matrix of eigenvectors corresponding to the non-zero principal components of $R_{pp}$ and $\Lambda$ is an $m \times m$ diagonal matrix of the associated non-zero eigenvalues, with m being the numerical rank of $R_{pp}$, wherein $R_{pp} = U\Lambda U^*$, wherein $R_{pp}$, $R_{dd}$ and $R_{dp}$ are elements of vector R as shown below:

$$R = \begin{bmatrix} R_{pp} & R_{dp}^* \\ R_{dp} & R_{dd} \end{bmatrix},$$

where R is the covariance matrix of the channel H, wherein $R_{pp}$ has $N_p \times N_p$ elements, wherein $R_{dp}$ has $N_d \times N_p$ elements and wherein $*R_{dd}$ has $N_d \times N_d$ elements, wherein $N_p$ is the number of transmitted pilot symbols and $N_d$ is the number of transmitted data symbols, wherein $E_p$ is the pilot energy per pilot symbol, and wherein x is the vector of received pilot symbols.

21. The apparatus of claim 20 wherein $N_p$ is greater than m.

* * * * *